(12) United States Patent
Wiener et al.

(10) Patent No.: US 8,319,820 B2
(45) Date of Patent: Nov. 27, 2012

(54) SYSTEMS, METHODS, AND MEDIA FOR PROVIDING CASCADED MULTI-POINT VIDEO CONFERENCING UNITS

(75) Inventors: Yair Wiener, Herzlia (IL); Ori Modai, Ramat Hasharon (IL)

(73) Assignee: Radvision, Ltd., Tel Aviv (IL)

( * ) Notice: Subject to any disclaimer, the term of this patent is extended or adjusted under 35 U.S.C. 154(b) by 1100 days.

(21) Appl. No.: 12/144,471

(22) Filed: Jun. 23, 2008

(65) Prior Publication Data

US 2009/0315975 A1    Dec. 24, 2009

(51) Int. Cl.
*H04N 7/14* (2006.01)
(52) U.S. Cl. .................. 348/14.09; 348/14.08
(58) Field of Classification Search .... 348/14.01–14.03, 348/14.05, 14.08–14.09, 14.12; 375/130, 375/240.02; 709/204, 208
See application file for complete search history.

(56) References Cited

U.S. PATENT DOCUMENTS

2006/0047750 A1\* 3/2006 Schmitt et al. ................ 709/204
2007/0200923 A1\* 8/2007 Eleftheriadis et al. ..... 348/14.08

FOREIGN PATENT DOCUMENTS

| WO | 03/065720 A1 | 8/2003 |
| WO | 2004/044710 A2 | 5/2004 |
| WO | 2005/048600 A1 | 5/2005 |
| WO | 2007/067990 A2 | 6/2007 |
| WO | 2007/076486 A2 | 7/2007 |
| WO | 2007/103889 A2 | 9/2007 |

OTHER PUBLICATIONS

Schwarz, H., Marpe D., and Wiegand, T., "Overview of the Scalable Video Coding Extension of the H.264/AVC Standard," IEE Transactions on Circuits and Systems for Video Technology, 17(9):1103-1120, Sep. 2007.

\* cited by examiner

*Primary Examiner* — Suhan Ni (57) ABSTRACT

Systems, methods, and media for providing cascaded multi-point video conferencing units are provided. In some embodiments, systems for providing cascaded multi-point conference units are provided, the systems comprising: at least one encoder that encodes a video signal into representations using a scalable video protocol based on required configurations of parameters for a first multi-point conferencing unit (MCU) and a second MCU; and at least one interface that distributes a first one of the representations to the first MCU and a second one of the representations to the second MCU without distributing the first one of the representations to the second MCU.

27 Claims, 6 Drawing Sheets

SYSTEMS, METHODS, AND MEDIA FOR PROVIDING CASCADED MULTI-POINT VIDEO CONFERENCING UNITS

TECHNICAL FIELD

The disclosed subject matter relates to systems, methods, and media for providing cascaded multi-point video conferencing units.

BACKGROUND

As organizations and individuals interact over ever-increasing distances, and communication technology advances and becomes less expensive, more and more people are using video conferencing systems. An important part of a typical video conferencing system is a multi-point conference unit (MCU) (also sometimes referred to as a multipoint control unit). An MCU is a device that enables conference endpoints (such as a video telephone, a video-enabled personal computer, etc.) to connect together.

Typically, MCUs are limited in the number of endpoints that can be connected to them. For example, an MCU may be limited to connecting ten endpoints. In order to have larger conferences than ten users, it is necessary to either obtain a larger MCU, or to cascade two or more smaller MCUs. Cascading is a process by which the two or more MCUs can communicate, and thus enable the endpoints connected to each to communicate (at least to some extent).

Cascading may also be used to decrease bandwidth on a wide area network (WAN) when a first set of users (who are local to each other) are connected to an MCU that is remotely located from the users and perhaps connected to a second set of users local to the MCU. For example, with a cascaded arrangement, such first users may be able to connect to a first MCU that is local to them (e.g., via a local area network), and that MCU may be able to connect, via a wide area network, to a second MCU that is remotely located from the first MCU. The first MCU may then locally handle the transfer of video between the first users, while the wide area network may only need to handle video being transmitted between the first set of users and the second set of users.

Current techniques for cascading MCUs, however, can present difficulties when different configurations of parameters (such as bit rate, frame rate, resolution, etc.) are required by one or more of the cascaded MCUs, or the endpoints connected to them.

SUMMARY

Systems, methods, and media for providing cascaded multi-point video conferencing units are provided. In some embodiments, systems for providing cascaded multi-point conference units are provided, the systems comprising: at least one encoder that encodes a video signal into representations using a scalable video protocol based on required configurations of parameters for a first multi-point conferencing unit (MCU) and a second MCU; and at least one interface that distributes a first one of the representations to the first MCU and a second one of the representations to the second MCU without distributing the first one of the representations to the second MCU.

In some embodiments, methods for providing cascaded multi-point conference units are provided, the methods comprising: encoding a video signal into representations using a scalable video protocol based on required configurations of parameters for a first multi-point conferencing unit (MCU) and a second MCU; and distributing a first one of the representations to the first MCU and a second one of the representations to the second MCU without distributing the first one of the representations to the second MCU.

In some embodiments, computer-readable media containing computer-executable instructions that, when executed by a processor, cause the processor to perform a method for providing cascaded multi-point conference units are provided, the method comprising: encoding a video signal into representations using a scalable video protocol based on required configurations of parameters for a first multi-point conferencing unit (MCU) and a second MCU; and distributing a first one of the representations to the first MCU and a second one of the representations to the second MCU without distributing the first one of the representations to the second MCU.

DETAILED DESCRIPTION

Systems, methods, and media for providing cascaded multi-point video conferencing units are provided. In accordance with various embodiments, two or more Multi-point Conferencing Units (MCUs) are cascaded and video is transmitted between the MCUs using a scalable video protocol.

A scalable video protocol may include any video compression protocol that allows decoding of different representations of video from data encoded using that protocol. The different representations of video may include different resolutions (spatial scalability), frame rates (temporal scalability), bit rates (SNR scalability), and/or any other suitable characteristic. Different representations may be encoded in different subsets of the data, or may be encoded in the same subset of the data, in different embodiments. For example, some scalable video protocols may use layering that provides one or more representations (such as a high resolution image of a user) of a video signal in one layer and one or more other representations (such as a low resolution image of the user) of the video signal in another layer. As another example, some scalable video protocols may split up a data stream (e.g., in the form of packets) so that different representations of a video signal are found in different portions of the data stream. Examples of scalable video protocols may include the Scalable Video Coding (SVC) protocol defined by the Scalable Video Coding Extension of the H.264/AVC Standard (Annex G) from the International Telecommunication Union (ITU), the MPEG2 protocol defined by the Motion Picture Experts Group, the H.263 (Annex O) protocol from the ITU, and the MPEG4 part 2 FGS protocol from the Motion Picture Experts Group, each of which is hereby incorporated by reference herein in its entirety.

Figure 1:
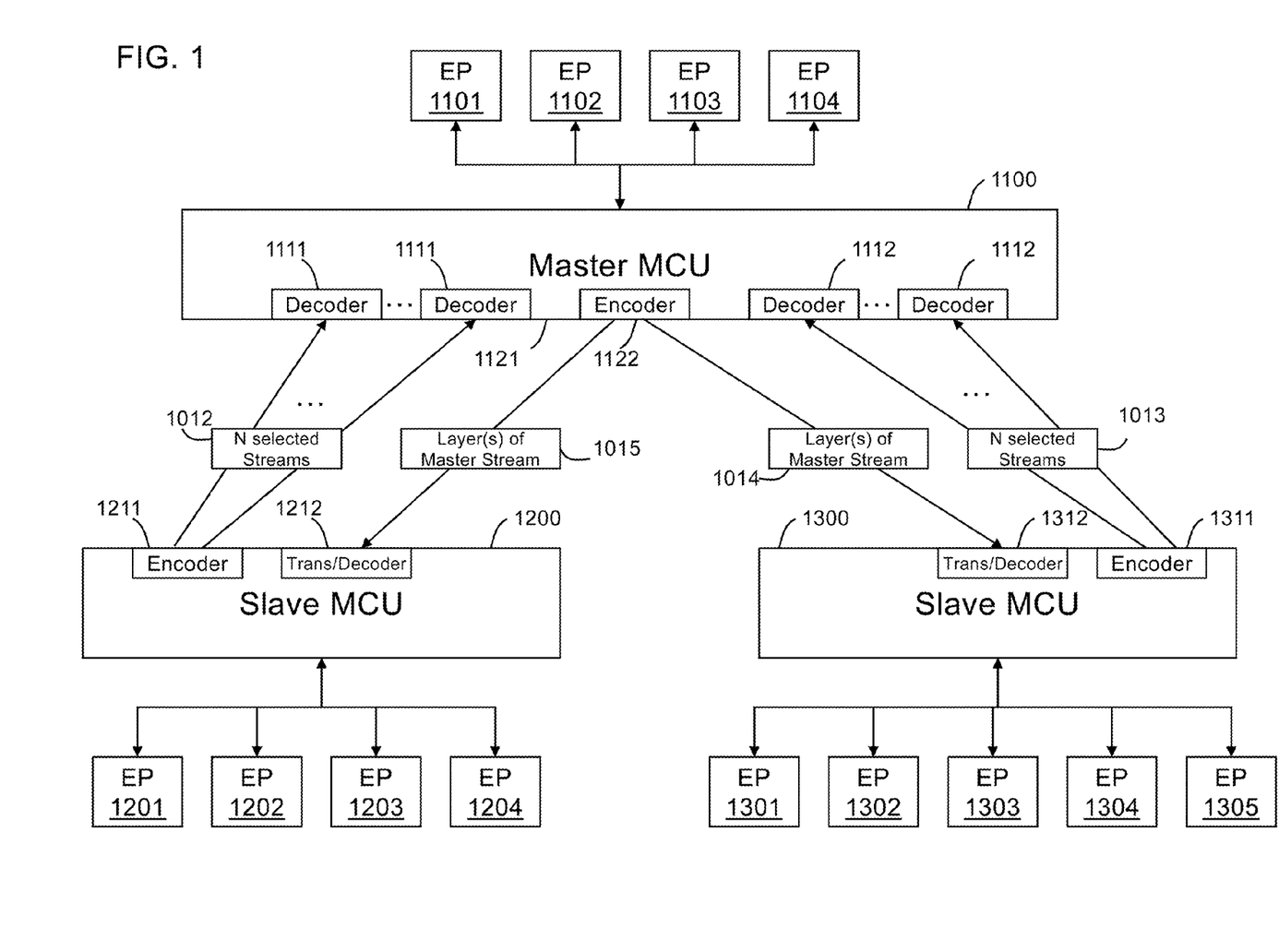
FIG. 1 is a block diagram of a master-slave cascading configuration in accordance with some embodiments of the disclosed subject matter.
Figure 2:
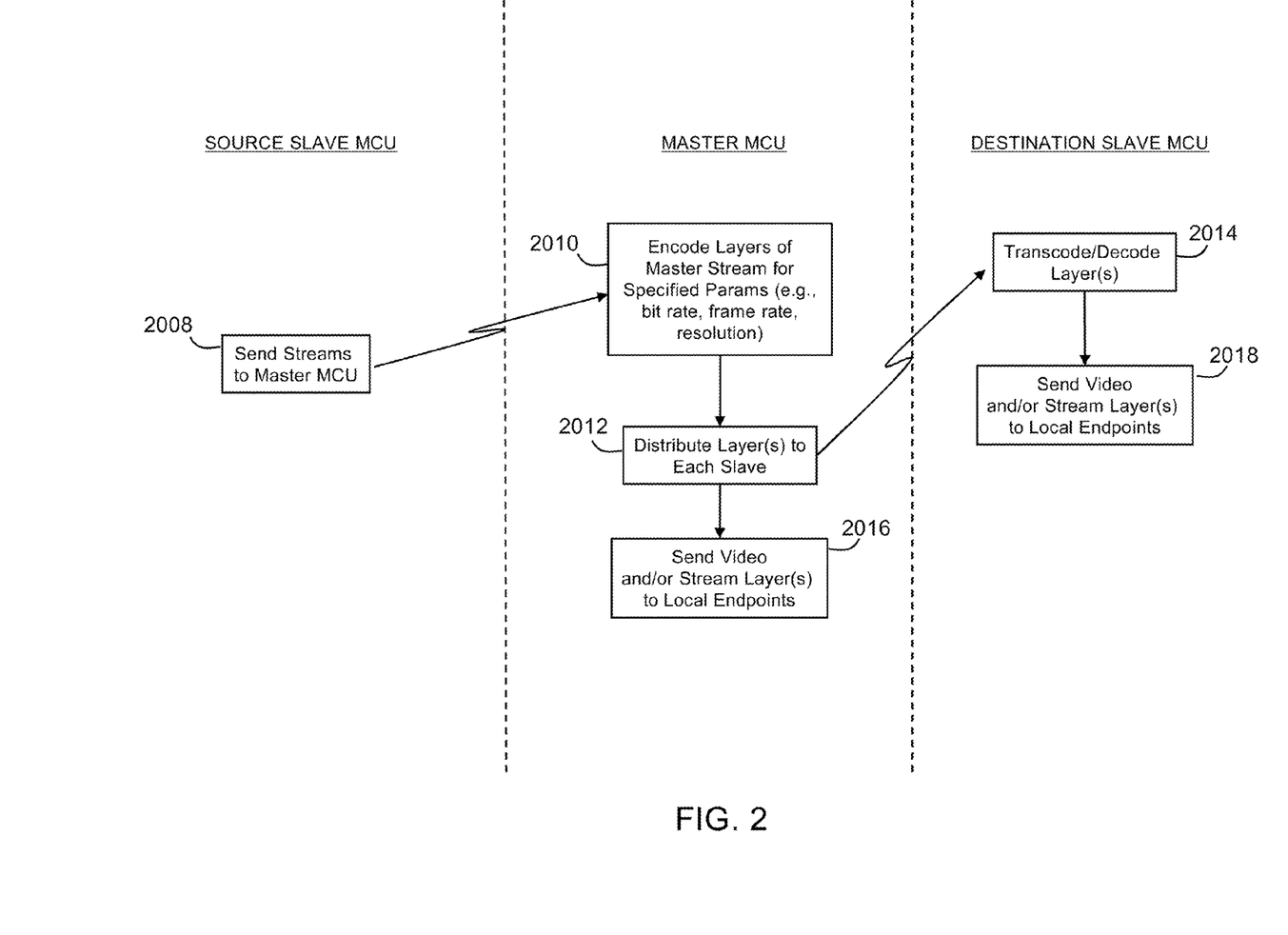
FIG. 2 is a diagram of a process for transmitting video in a master-slave cascading configuration in accordance with some embodiments of the disclosed subject matter.

In some embodiments, MCUs may be cascaded in a master and slave configuration as illustrated in FIGS. 1 and 2. As shown, a master MCU 1100 may be coupled to a plurality of endpoints 1101, 1102, 1103, and 1104 (which may be local to MCU 1100), a first slave MCU 1200, and a second slave MCU 1300. Endpoints 1101, 1102, 1103, and 1104 may be any suitable endpoints for use in a video conferencing system, such as endpoints provided by LifeSize Communications, Inc. and Aethra, Inc., and any suitable number (including none) of endpoints may be used. Although two slave MCUs 1200 and 1300 are shown, any suitable number of slave MCUs may be used. Like master MCU 1100, slave MCUs 1200 and 1300 may also be coupled to a plurality of endpoints 1201, 1202, 1203, and 1204 (which may be local to MCU 1200), and endpoints 1301, 1302, 1303, 1304, and 1305 (which may be local to MCU 1300), respectively. Endpoints 1201, 1202, 1203, 1204, 1301, 1302, 1303, 1304, and 1305 may be any suitable endpoints for use in a video conferencing system, such as endpoints provided by LifeSize Communications, Inc. and Aethra, Inc., and any suitable number of endpoints may be used.

In addition to providing one or more of the features described herein, master MCU 1100, slave MCU 1200, and/or slave MCU 1300 may provide any suitable MCU functions, such as those functions provided by MCUs provided by Tandberg Telecom AS and Polycom, Inc.

As illustrated in FIG. 1, master MCU 1100 may be coupled to slave MCU 1200 by streams 1012 and/or 1015 and to slave MCU 1300 by streams 1013 and/or 1014. Any suitable number of streams 1012 and 1015 may be implemented in some embodiments. For example, one stream 1012 and one stream 1015 may be implemented. Streams 1012 and 1015 may be transmitted between master MCU 1100 and slave MCU 1200 using any suitable hardware and/or software, and may be transmitted on one or more physical and/or logical paths (e.g., such as via computer, telephone, satellite, and/or any other suitable network). Similarly, any suitable number of streams 1013 and 1014 may be implemented in some embodiments. For example, one stream 1013 and one stream 1014 may be implemented. Streams 1013 and 1014 may be transmitted between master MCU 1100 and slave MCU 1300 using any suitable hardware and/or software, and may be transmitted on one or more physical and/or logical paths (e.g., such as via computer, telephone, satellite, and/or any other suitable network).

In some embodiments, streams 1012 and 1013 may be used to convey video from a source slave MCU 1200 or 1300, respectively, to master MCU 1100. This is illustrated at step 2008 of FIG. 2. These streams may include a composite video of multiple users (e.g., which may include one or more of the users at the local endpoints) or a video of a single user. Streams 1012 and 1013 may be implemented using any suitable protocol, such as the H.264, H.263, and H.261 protocols from the ITU for example. For example, one or more encoders 1211 in slave MCU 1200 may send one or more (designated as N in FIG. 1) streams 1012 to master MCU 1100, and one or more encoders 1311 in slave MCU 1300 may send one or more (designated as N in FIG. 1) streams 1013 to master MCU 1100. These streams may then be received by N corresponding decoders 1111 (for streams 1012) and N corresponding decoders 1112 (for streams 1013).

As illustrated at step 2010 of FIG. 2, master MCU 1100 may encode (using one or more encoders 1122) a master stream using a scalable video protocol, such as the Scalable Video Coding (SVC) protocol defined by the Scalable Video Coding Extension of the H.264/AVC Standard (Annex G). This master stream may include any suitable number of layers. Each layer may be configured for a different configuration of parameters as required by one or more of slave MCUs 1200 and 1300 and endpoints 1201, 1202, 1203, 1204, 1301, 1302, 1303, 1304, and 1305. A configuration of parameters may include any suitable settings of parameters for receiving a video signal, such as specified values of a bit rate, a frame rate, a resolution, etc.

After encoding the master stream, master MCU 1100 may distribute one or more layers to a decoder (e.g., 1212 or 1312) in each slave according to its required configuration(s) of parameters as illustrated at step 2012 of FIG. 2. For example, slave MCU 1200 may only receive one of the layers in the master stream, while slave MCU 1300 may receive two of the layers in the master stream. In some embodiments, multiple layers may be substantially simultaneously distributed to the slave MCUs using a multicast network.

Each slave MCU 1200 and 1300 may next transcode/decode the one or more layers to a required video format as illustrated at step 2014 of FIG. 2. For example, slave MCU 1200 may receive a single layer that may then be transcoded to two different types of video streams corresponding to the requirements of local endpoints 1201 and 1202 coupled to slave MCU 1200. Any suitable transcoding technique may be used in accordance with some embodiments.

The video stream(s), and/or the received layer(s), can then be provided to the one or more local endpoints coupled to the master and slave MCUs based on the requirements of the endpoints as illustrated at steps 2016 and 2018 of FIG. 2.

Figure 3:
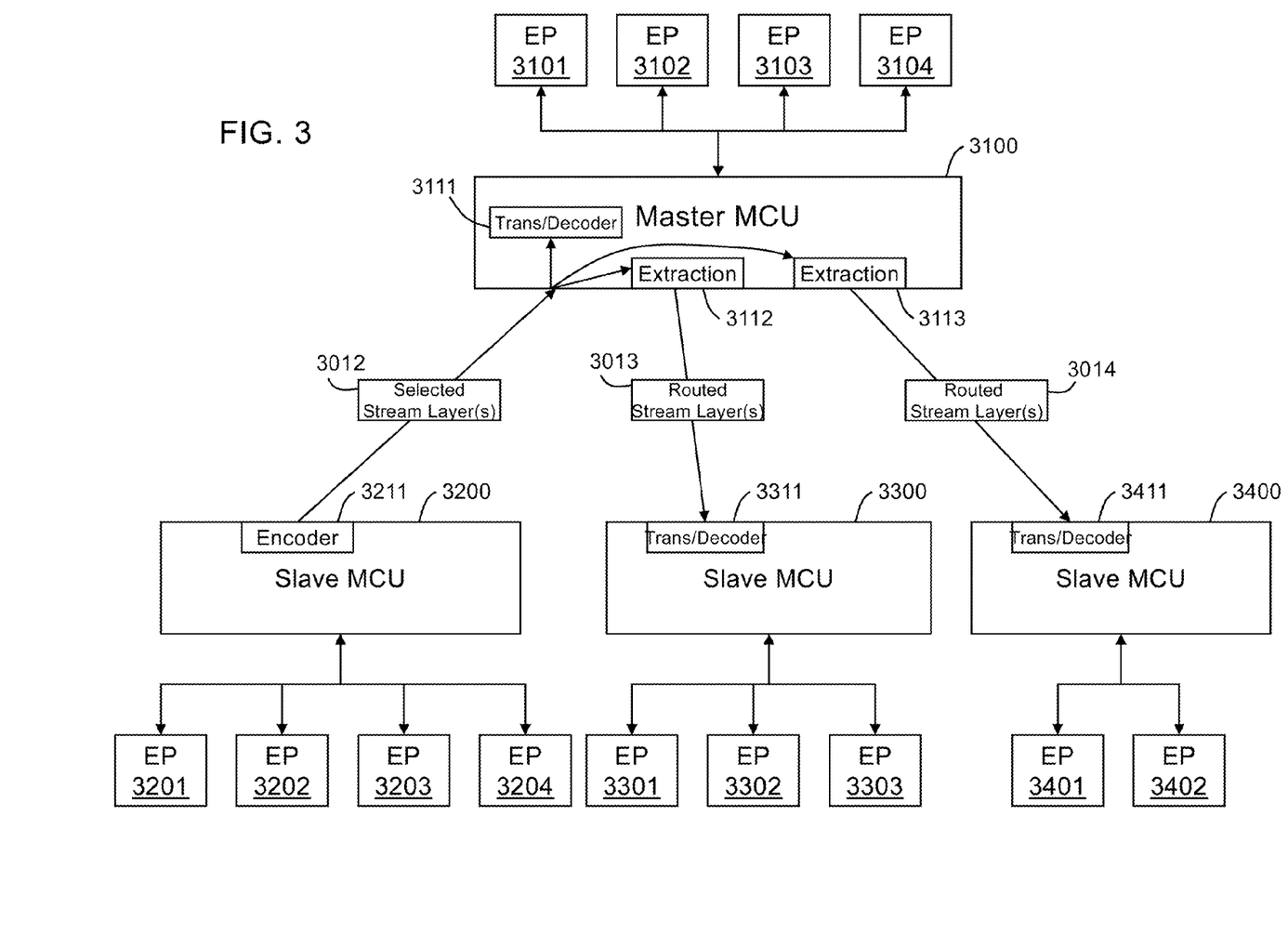
FIG. 3 is a block diagram of a routed mesh cascading configuration in accordance with some embodiments of the disclosed subject matter.
Figure 4:
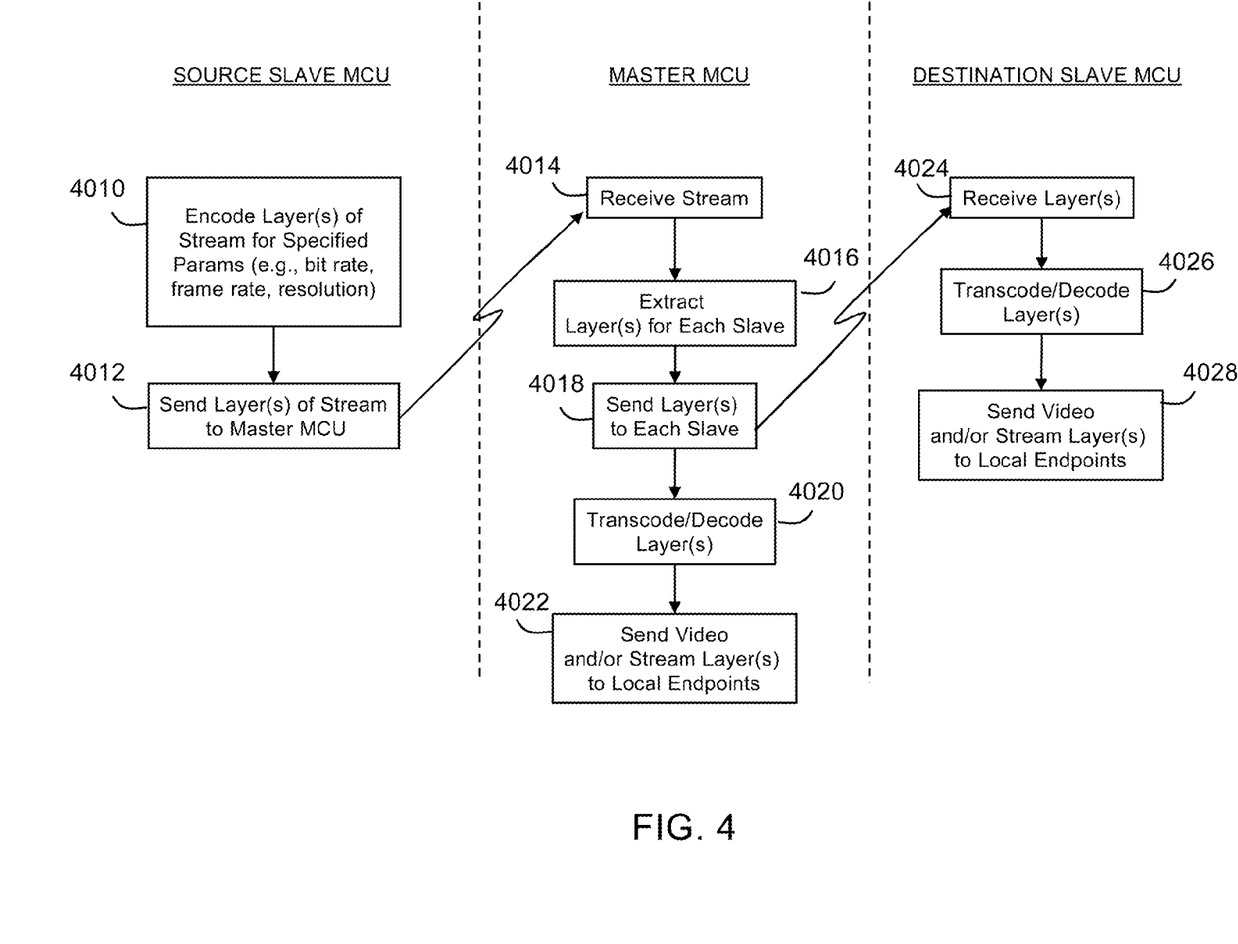
FIG. 4 is a diagram of a process for transmitting video in a routed mesh cascading configuration in accordance with some embodiments of the disclosed subject matter.

In some embodiments, MCUs may be cascaded in a routed mesh configuration as illustrated in FIGS. 3 and 4. As shown, a master MCU 3100 may be coupled to a plurality of endpoints 3101, 3102, 3103, and 3104 (which may be local to MCU 3100), a first slave MCU 3200, a second slave MCU 3300, and a third slave MCU 3400. Endpoints 3101, 3102, 3103, and 3104 may be any suitable endpoints for use in a video conferencing system, and any suitable number (including none) of endpoints may be used. Although three slave MCUs 3200, 3300, and 3400 are shown, any suitable number of slave MCUs may be used. Like master MCU 3100, slave MCUs 3200, 3300, and 3400 may also be coupled to a plurality of endpoints 3201, 3202, 3203, and 3204 (which may be local to MCU 3200), endpoints 3301, 3302, and 3303 (which may be local to MCU 3300), and endpoints 3401 and 3402 (which may be local to MCU 3400), respectively. Endpoints 3201, 3202, 3203, 3204, 3301, 3302, 3303, 3401, and 3402 may be any suitable endpoints for use in a video conferencing system, and any suitable number of endpoints may be used.

In addition to providing one or more of the features described herein, master MCU 3100, slave MCU 3200, slave MCU 3300, and/or slave MCU 3400 may provide any suitable MCU functions.

As illustrated in FIG. 3, master MCU 3100 may be coupled to slave MCU 3200 by stream 3012, to slave MCU 3300 by stream 3013, and to slave MCU 3400 by stream 3014. Any suitable number of streams 3012, 3013, and 3014 may be implemented in some embodiments, and streams going in the opposite direction between each slave MCU and the master MCU 3100 may additionally be present (although they are not illustrated to avoid overcomplicating FIG. 3). Streams 3012, 3013, and 3014 may be transmitted between master MCU 3100 and slave MCUs 3200, 3300, and 3400 using any suitable hardware and/or software, and may be transmitted on one or more physical and/or logical paths (e.g., such as via computer, telephone, satellite, and/or any other suitable network).

To provide video from one or more participants (such as the current speaker) at one or more local endpoints of slave MCU 3200 (a source slave MCU) to the master MCU and/or other slave MCUs (destination slave MCUs), slave MCU 3200 may encode (using encoder 3211) the video into a scalable video protocol, such as a layered video stream 3012 corresponding to configurations of parameters required by the master MCU and/or other slave MCUs, as illustrated at step 4010 of FIG. 4. This layered video stream may be implemented using the Scalable Video Coding (SVC) protocol defined by the Scalable Video Coding Extension of the H.264/AVC Standard, for example. A configuration of parameters may include any suitable settings of parameters for a video signal, such as specified values of a bit rate, a frame rate, a resolution, etc. This layered video stream 3012 may then be sent to decoder 3111 at the master MCU as shown at steps 4012 and 4014 of FIG. 4.

Master MCU 3100 may then extract layers 3013 and 3014 for each destination MCU from the received layered video stream as illustrated at step 4016 of FIG. 4, and send the extracted layers to slave MCUs 3300 and 3400 using encoders 3112 and 3113 as illustrated at steps 4018 and 4024 of FIG. 4. The master MCU may extract the relevant layers of the stream for each slave MCU according to each slave MCU's required configuration parameters.

The master and slave MCUs may then transcode/decode the received layer(s) (as illustrated at steps 4020 and 4026 of FIG. 4) and distribute the transcoded/decoded video and/or layer(s) to the participants at the local endpoints (as illustrated at steps 4022 and 4028 of FIG. 4). The distribution may be accomplished in any suitable manner, such as by sending the layer(s) to each destination slave MCU directly (e.g., using a unicast mechanism), by using a multicast transport layer, by using a central network entity (acting as a routing mesh; not shown), etc.

Figure 5:
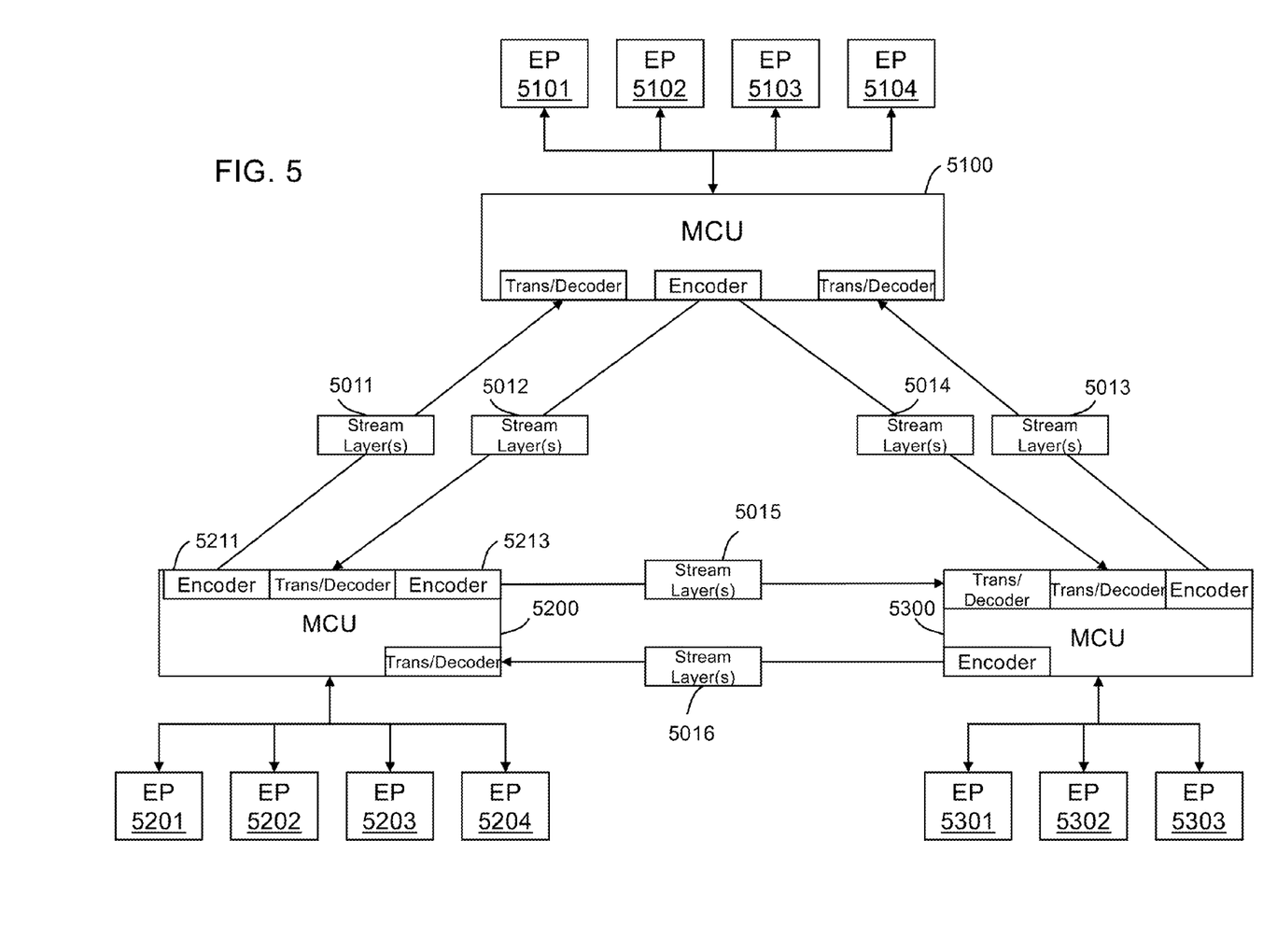
FIG. 5 is a block diagram of a full mesh cascading configuration in accordance with some embodiments of the disclosed subject matter.
Figure 6:
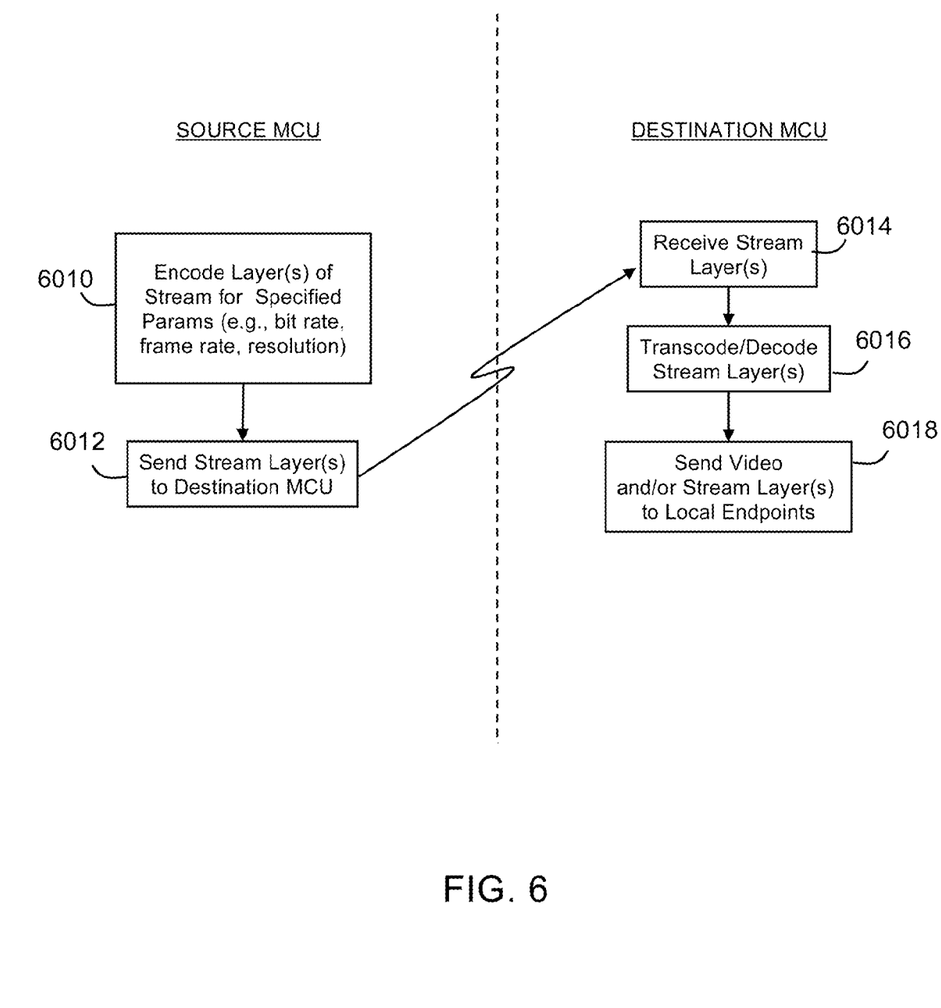
FIG. 6 is a diagram of a process for transmitting video in a full mesh cascading configuration in accordance with some embodiments of the disclosed subject matter.

In some embodiments, MCUs may be cascaded in a full mesh configuration as illustrated in FIGS. 5 and 6. As shown, a first MCU 5100 may be coupled to a plurality of endpoints 5101, 5102, 5103, and 5104 (which may be local to MCU 5100), a second MCU 5200, and a third MCU 5300. Endpoints 5101, 5102, 5103, and 5104 may be any suitable endpoints for use in a video conferencing system, and any suitable number (including none) of endpoints may be used. Although three MCUs 5100, 5200, and 5300 are shown, any suitable number of MCUs may be used. Like first MCU 5100, the other MCUs 5200 and 5300 may also be coupled to a plurality of endpoints 5201, 5202, 5203, and 5204 (which may be local to MCU 5200) and endpoints 5301, 5302, and 5303 (which may be local to MCU 5300), respectively. Endpoints 5201, 5202, 5203, 5204, 5301, 5302, and 5303 may be any suitable endpoints for use in a video conferencing system, and any suitable number of endpoints may be used.

In addition to providing one or more of the features described herein, MCUs 5100, 5200, and/or 5300 may provide any suitable MCU functions.

As illustrated in FIG. 5, MCU 5100 may be coupled to MCU 5200 by streams 5011 and 5012, and to MCU 5300 by streams 5013 and 5014. Similarly, MCU 5200 may be coupled to MCU 5300 by streams 5015 and 5016. Any suitable number of streams 5011, 5012, 5013, 5014, 5015, and 5016 may be implemented in some embodiments. Streams 5011, 5012, 5013, 5014, 5015, and 5016 may be transmitted between MCUs 5100, 5200, and 5300 using any suitable hardware and/or software, and may be transmitted on one or more physical and/or logical paths (e.g., such as via computer, telephone, satellite, and/or any other suitable network).

To provide video from a source MCU to the other MCUs in a full mesh configuration, the source MCU may provide the video directly to each other MCU. For example, MCU 5200 (acting as a source MCU) may provide a video of one of its local participants to the other MCUs (acting as destination MCUs) by first encoding the video using a scalable video protocol, e.g., to form a layered video stream, based on the configuration parameters required by the other MCUs, as illustrated at step 6010 of FIG. 6. The encoding may be performed by encoders 5211 and 5213, which may first form a layered video stream (e.g., by using the Scalable Video Coding (SVC) protocol defined by the Scalable Video Coding Extension of the H.264/AVC Standard) and then modify the layered stream using Coarse Grain Scalability (CGS), Medium Grain Scalability (MGS), Fine Grain Scalability (FGS), and/or any other suitable technique to match the layered stream to the required configuration parameters of the other MCUs.

The required layers of the video stream may be sent to destination MCU 5100 via stream 5011 and to destination MCU 5300 via stream 5015, as illustrated at steps 6012 and 6014 of FIG. 6. This transmission can be performed directly (e.g., using a unicast mechanism), using a multicast transport layer, using a central network entity (acting as a routing mesh; not shown), etc.

The destination MCUs may then transcode/decode the received layer(s) (as illustrated at step 6016 of FIG. 6) and distribute the transcoded/decoded video and/or received layer(s) to the participants at the local endpoints (as illustrated at steps 6018 of FIG. 6).

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for providing cascaded multi-point conference units, comprising:
   at least one encoder that encodes a video signal into representations using a scalable video protocol based on required configurations of parameters for a first multi-point conferencing unit (MCU) and a second MCU; and
   at least one interface that distributes a first one of the representations to the first MCU and a second one of the representations to the second MCU without distributing the first one of the representations to the second MCU.

2. The system of claim 1, wherein the parameters include at least one of bit rate, frame rate, and resolution.

3. The system of claim 1, wherein the at least one interface is part of a master MCU, the first MCU is a slave MCU, and the second MCU is a slave MCU.

4. The system of claim 1, wherein the at least one encoder is in a third, slave MCU, the at least one interface is in a master MCU, the first MCU is a slave MCU, and the second MCU is a slave MCU.

5. The system of claim 1, wherein the at least one encoder is in a third MCU, and the first MCU, the second MCU, and the third MCU are arranged in a full mesh configuration.

6. The system of claim 1, further comprising a transcoder and/or decoder that transcodes and/or decodes at least one of the representations into a resulting signal.

7. The system of claim 6, further comprising an interface that sends the resulting-signal to an endpoint.

8. The system of claim 1, wherein, the scalable video, protocol is implemented using the Scalable Video Coding (SVC) protocol defined by the Scalable Video Coding Extension of the H.264/AVC Standard.

9. The system of claim 1, wherein the representations are layers in a layered video stream.

10. A method for providing cascaded multi-point conference units, comprising:
   encoding a video signal into representations using a scalable video protocol based on required configurations of parameters for a first multi-point conferencing unit (MCU) and a second MCU; and
   distributing a first one of the representations to the first MCU and a second one of the representations to the second MCU without distributing the first one of the representations to the second MCU.

11. The method of claim 10, wherein the parameters include at least one of bit rate, frame rate, and resolution.

12. The method of claim 10, wherein the distributing is performed from a master MCU, the first MCU is a slave MCU, and the second MCU is a slave MCU.

13. The method of claim 10, wherein the encoding is performed in a third, slave MCU, the distributing is performed in a master MCU, the first MCU is a slave MCU, and the second MCU is a slave MCU.

14. The method of claim 10, wherein the encoding is performed in a third MCU, and the first MCU, the second MCU, and the third MCU are arranged in a full mesh configuration.

15. The method of claim 10, further comprising transcoding and/or decoding at least one of the representations into a resulting signal.

16. The method of claim 15, further comprising sending the resulting signal to an endpoint.

17. The method of claim 10, wherein the scalable video protocol is implemented using the Scalable Video Coding (SVC) protocol defined by the Scalable Video Coding Extension of the 1.264/AVC Standard.

18. The method of claim 10, wherein the representations are layers in a layered video stream.

19. A non-transitory computer-readable medium containing computer-executable instructions that, when executed by a processor, cause the processor to perform a method for providing cascaded multi-point conference units, the method comprising:
   encoding a video signal into representations using a scalable video protocol based on required configurations of parameters for a first multi-point conferencing unit (MCU) and a second MCU; and
   distributing a first one of the representations to the first MCU and a second one of the representations to the second MCU without distributing the first one of the representations to the second MCU.

20. The non-transitory medium of claim 19, wherein the parameters include at least one of bit rate, frame rate, and resolution.

21. The non-transitory medium of claim 19, wherein the distributing is performed from a master MCU, the first MCU is a slave MCU, and the second MCU is a slave MCU.

22. The non-transitory medium of claim 19, wherein the encoding is performed in a third, slave MCU, the distributing is performed in a master MCU, the first MCU is a slave MCU, and the second MCU is a slave MCU.

23. The non-transitory medium of claim 19, wherein the encoding is performed in a third MCU, and the first MCU, the second MCU, and the third MCU are arranged in a full mesh configuration.

24. The non-transitory medium of claim 19, wherein the method further comprises transcoding and/or decoding at least one of the representations into a resulting signal.

25. The non-transitory medium of claim 24, wherein the method further comprises sending the resulting signal to an endpoint.

26. The non-transitory medium of claim 19, wherein the scalable video protocol is implemented using the Scalable Video Coding (SVC) protocol defined by the Scalable Video Coding Extension of the H.264/AVC Standard.

27. The non-transitory medium of claim 19, wherein the representations are layers in a layered video stream.

* * * * *